United States Patent
Sujan et al.

(10) Patent No.: US 8,833,496 B2
(45) Date of Patent: Sep. 16, 2014

(54) SYSTEM, METHOD, AND APPARATUS FOR BATTERY PACK THERMAL MANAGEMENT

(75) Inventors: Vivek Anand Sujan, Columbus, IN (US); Nazar Al-Khayat, Larbert (GB); Bangalore Siddalingappa Nagabhushana, Indiranagar (IN)

(73) Assignee: Cummins Inc., Columbus, IN (US)

( * ) Notice: Subject to any disclaimer, the term of this patent is extended or adjusted under 35 U.S.C. 154(b) by 723 days.

(21) Appl. No.: 12/972,707

(22) Filed: Dec. 20, 2010

(65) Prior Publication Data

US 2012/0156534 A1   Jun. 21, 2012

(51) Int. Cl.
| | |
|---|---|
| H01M 10/50 | (2006.01) |
| H01M 10/659 | (2014.01) |
| H01M 10/66 | (2014.01) |
| B60L 11/18 | (2006.01) |
| H01M 10/613 | (2014.01) |
| H01M 10/48 | (2006.01) |
| H01M 10/625 | (2014.01) |
| H01M 10/615 | (2014.01) |
| H01M 10/663 | (2014.01) |
| H01M 10/667 | (2014.01) |

(52) U.S. Cl.
CPC ...... *H01M 10/5004* (2013.01); *H01M 10/5089* (2013.01); *Y02T 10/7005* (2013.01); *H01M 10/5093* (2013.01); *B60L 11/187* (2013.01); *H01M 10/486* (2013.01); *Y02T 10/166* (2013.01); *Y02E 60/12* (2013.01); *B60L 2240/545* (2013.01); *H01M 10/5016* (2013.01); *H01M 10/5006* (2013.01); *Y02T 10/705* (2013.01); *B60L 2270/44* (2013.01); *H01M 10/5095* (2013.01); *H01M 10/5097* (2013.01)
USPC ........................ 180/65.265; 180/68.2; 429/62

(58) Field of Classification Search
USPC ............ 180/68.5, 68.1, 68.2, 65.265; 429/62, 429/61
See application file for complete search history.

(56) References Cited

U.S. PATENT DOCUMENTS

| | | |
|---|---|---|
| 3,566,717 A | 3/1971 | Berman et al. |
| 3,732,751 A | 5/1973 | Berman et al. |

(Continued)

FOREIGN PATENT DOCUMENTS

| | | |
|---|---|---|
| WO | 2006135871 A2 | 12/2006 |
| WO | 2010116104 A1 | 10/2010 |

OTHER PUBLICATIONS

International Search Report and Written Opinion, ISA/US, PCT/2011/056901, Cummins Inc., Mar. 4, 2012.

(Continued)

*Primary Examiner* — John Walters
*Assistant Examiner* — Brian Swenson
(74) *Attorney, Agent, or Firm* — Krieg DeVault LLP

(57) ABSTRACT

An apparatus is described including a hybrid power train having an internal combustion engine and an electric motor. The apparatus includes a hybrid power system battery pack that is electrically coupled to the electric motor. The apparatus includes an energy securing device that is thermally coupled to the hybrid power system battery pack. The energy securing device selectively removes thermal energy from the hybrid power system battery pack, and secure removed thermal energy. The energy securing device secures the removed thermal energy by storing the energy in a non-thermal for, or by using the energy to accommodate a present energy requirement.

12 Claims, 2 Drawing Sheets

(56) References Cited

U.S. PATENT DOCUMENTS

| | | | |
|---|---|---|---|
| 3,923,115 A | 12/1975 | Helling | |
| 4,021,677 A | 5/1977 | Rosen et al. | |
| 4,099,589 A | 7/1978 | Williams | |
| 4,165,795 A | 8/1979 | Lynch et al. | |
| 4,233,858 A | 11/1980 | Rowlett | |
| 4,305,254 A | 12/1981 | Kawakatsu et al. | |
| 4,335,429 A | 6/1982 | Kawakatsu | |
| 4,405,029 A | 9/1983 | Hunt | |
| 4,407,132 A | 10/1983 | Kawakatsu et al. | |
| 4,438,342 A | 3/1984 | Kenyon | |
| 4,489,242 A | 12/1984 | Worst | |
| 4,588,040 A | 5/1986 | Albright, Jr. et al. | |
| 5,251,588 A | 10/1993 | Tsujii et al. | |
| 5,255,733 A | 10/1993 | King | |
| 5,323,868 A | 6/1994 | Kawashima | |
| 5,327,991 A | 7/1994 | Yoshida | |
| 5,327,992 A | 7/1994 | Boll | |
| 5,358,317 A | 10/1994 | Cikanek | |
| 5,403,244 A | 4/1995 | Tankersley et al. | |
| 5,428,274 A | 6/1995 | Furutani et al. | |
| 5,433,282 A | 7/1995 | Moroto et al. | |
| 5,492,189 A | 2/1996 | Kriegler et al. | |
| 5,513,719 A | 5/1996 | Moroto et al. | |
| 5,531,285 A | 7/1996 | Green | |
| 5,558,173 A | 9/1996 | Sherman | |
| 5,558,595 A | 9/1996 | Schmidt et al. | |
| 5,562,565 A | 10/1996 | Moroto et al. | |
| 5,635,805 A | 6/1997 | Ibaraki et al. | |
| 5,643,119 A | 7/1997 | Yamaguchi et al. | |
| 5,650,931 A | 7/1997 | Nii | |
| 5,678,760 A | 10/1997 | Muso et al. | |
| 5,713,425 A | 2/1998 | Buschhaus et al. | |
| 5,722,502 A | 3/1998 | Kubo | |
| 5,755,303 A | 5/1998 | Yamamoto et al. | |
| 5,762,156 A | 6/1998 | Bates et al. | |
| 5,775,449 A | 7/1998 | Moroto et al. | |
| 5,778,326 A | 7/1998 | Moroto et al. | |
| 5,788,006 A | 8/1998 | Yamaguchi | |
| 5,789,881 A | 8/1998 | Egami et al. | |
| 5,832,396 A | 11/1998 | Moroto et al. | |
| 5,845,731 A | 12/1998 | Buglione et al. | |
| 5,846,155 A | 12/1998 | Taniguchi et al. | |
| 5,864,771 A | 1/1999 | Yokoyama et al. | |
| 5,865,263 A | 2/1999 | Yamaguchi et al. | |
| 5,871,859 A | 2/1999 | Parise | |
| 5,892,346 A | 4/1999 | Moroto et al. | |
| 5,908,077 A | 6/1999 | Moore | |
| 5,924,406 A | 7/1999 | Kinugasa et al. | |
| 5,934,396 A | 8/1999 | Kurita | |
| 5,971,092 A | 10/1999 | Walker | |
| 6,009,365 A | 12/1999 | Takahara et al. | |
| 6,019,699 A | 2/2000 | Hoshiya et al. | |
| 6,026,921 A | 2/2000 | Aoyama et al. | |
| 6,032,753 A | 3/2000 | Yamazaki et al. | |
| 6,032,869 A | 3/2000 | Ito et al. | |
| 6,057,050 A | 5/2000 | Parise | |
| 6,070,650 A | 6/2000 | Inoue et al. | |
| 6,223,842 B1 | 5/2001 | Masaki | |
| 6,223,846 B1 | 5/2001 | Schechter | |
| 6,251,042 B1 | 6/2001 | Peterson et al. | |
| 6,300,858 B1 | 10/2001 | Kalapodis et al. | |
| 6,334,079 B1 | 12/2001 | Matsubara et al. | |
| 6,374,780 B1 | 4/2002 | Rutyna et al. | |
| 6,404,636 B1 | 6/2002 | Staggers et al. | |
| 6,427,793 B1 | 8/2002 | Hanada et al. | |
| 6,452,286 B1 | 9/2002 | Kubo et al. | |
| 6,464,028 B1 | 10/2002 | Imani | |
| 6,467,286 B2 | 10/2002 | Hasebe et al. | |
| 6,487,477 B1 | 11/2002 | Woestman et al. | |
| 6,501,190 B1 | 12/2002 | Seguchi et al. | |
| 6,515,872 B2 | 2/2003 | Nakayama et al. | |
| 6,533,031 B1 | 3/2003 | Garcia et al. | |
| 6,570,749 B1 | 5/2003 | Ling et al. | |
| 6,573,687 B2 | 6/2003 | Kimura et al. | |
| 6,598,496 B2 | 7/2003 | Pannell | |
| 6,616,059 B2 | 9/2003 | Sabhapathy et al. | |
| 6,647,961 B2 | 11/2003 | Suzuki et al. | |
| 6,653,002 B1 | 11/2003 | Parise | |
| 6,668,953 B1 | 12/2003 | Reik et al. | |
| 6,725,679 B2 | 4/2004 | Itoh et al. | |
| 6,807,931 B2 | 10/2004 | Taylor et al. | |
| 6,863,139 B2 | 3/2005 | Egami et al. | |
| 6,887,180 B2 | 5/2005 | Pels et al. | |
| 6,901,751 B2 | 6/2005 | Bunting et al. | |
| 6,910,329 B2 | 6/2005 | Bunting et al. | |
| 6,915,629 B2 | 7/2005 | Szymkowicz | |
| 6,928,807 B2 | 8/2005 | Jacob et al. | |
| 6,942,728 B2 | 9/2005 | Caillat et al. | |
| 7,007,464 B1 | 3/2006 | Asami et al. | |
| 7,024,858 B2 | 4/2006 | Gray, Jr. | |
| 7,028,793 B2 | 4/2006 | Hu et al. | |
| 7,082,905 B2 | 8/2006 | Fukuda et al. | |
| 7,104,347 B2 | 9/2006 | Severinsky et al. | |
| 7,104,920 B2 | 9/2006 | Beaty et al. | |
| 7,114,585 B2 | 10/2006 | Man et al. | |
| 7,119,454 B1 | 10/2006 | Chiao | |
| 7,145,788 B2 * | 12/2006 | Plummer | 363/141 |
| 7,150,938 B2 | 12/2006 | Munshi et al. | |
| 7,188,020 B2 | 3/2007 | Yasui et al. | |
| 7,234,552 B2 | 6/2007 | Prema et al. | |
| 7,276,815 B2 | 10/2007 | Algrain et al. | |
| 7,284,594 B2 | 10/2007 | Sanada et al. | |
| 7,303,504 B2 | 12/2007 | Uchisasai et al. | |
| 7,360,615 B2 | 4/2008 | Salman et al. | |
| 7,370,612 B2 * | 5/2008 | Hanai | 123/41.14 |
| 7,377,237 B2 | 5/2008 | Carney et al. | |
| 7,380,586 B2 | 6/2008 | Gawthrop | |
| 7,391,129 B2 | 6/2008 | Chiao et al. | |
| 7,392,871 B2 | 7/2008 | Severinsky et al. | |
| 7,411,312 B2 | 8/2008 | Chiao | |
| 7,426,910 B2 * | 9/2008 | Elwart | 123/46 E |
| 7,448,458 B2 | 11/2008 | Meyer | |
| 7,455,134 B2 | 11/2008 | Severinsky et al. | |
| 7,492,055 B2 | 2/2009 | Chiao | |
| 7,520,353 B2 | 4/2009 | Severinsky et al. | |
| 7,568,539 B2 | 8/2009 | Abe et al. | |
| 7,572,201 B2 | 8/2009 | Supina et al. | |
| 7,578,363 B2 | 8/2009 | Kim | |
| 7,582,034 B2 | 9/2009 | Usoro | |
| 7,582,980 B2 | 9/2009 | Motoike et al. | |
| 7,793,492 B2 | 9/2010 | Abraham et al. | |
| 8,033,351 B2 * | 10/2011 | Tuli | 180/65.29 |
| 8,035,349 B2 * | 10/2011 | Lubawy | 320/150 |
| 8,261,868 B2 * | 9/2012 | Goenka et al. | 180/68.2 |
| 2003/0116368 A1 | 6/2003 | Winkelman et al. | |
| 2004/0045749 A1 | 3/2004 | Jaura et al. | |
| 2006/0101809 A1 | 5/2006 | Bodo et al. | |
| 2007/0112475 A1 | 5/2007 | Koebler et al. | |
| 2007/0130922 A1 | 6/2007 | Dye et al. | |
| 2007/0225888 A1 | 9/2007 | Morris | |
| 2007/0245737 A1 | 10/2007 | Inaba et al. | |
| 2007/0289291 A1 | 12/2007 | Rabinovich et al. | |
| 2008/0039263 A1 | 2/2008 | Usoro | |
| 2008/0051242 A1 | 2/2008 | Usoro | |
| 2008/0060589 A1 | 3/2008 | Carney et al. | |
| 2008/0099256 A1 | 5/2008 | Holmes et al. | |
| 2008/0103679 A1 | 5/2008 | Ruiz | |
| 2008/0224478 A1 | 9/2008 | Tamor | |
| 2008/0242498 A1 | 10/2008 | Miller et al. | |
| 2008/0251303 A1 | 10/2008 | Rouaud et al. | |
| 2008/0257311 A1 | 10/2008 | Spicer et al. | |
| 2009/0115491 A1 | 5/2009 | Anwar et al. | |
| 2009/0118090 A1 | 5/2009 | Heap et al. | |
| 2009/0118969 A1 | 5/2009 | Heap et al. | |
| 2009/0188450 A1 | 7/2009 | Kline et al. | |
| 2009/0195203 A1 | 8/2009 | Yurgil | |
| 2009/0197727 A1 | 8/2009 | Janson | |
| 2009/0197728 A1 | 8/2009 | Janson | |
| 2009/0198429 A1 | 8/2009 | Farrel et al. | |
| 2009/0199553 A1 | 8/2009 | Nishimura et al. | |
| 2009/0200094 A1 | 8/2009 | Zohrer et al. | |
| 2009/0200095 A1 | 8/2009 | Kawasaki | |

(56) References Cited

U.S. PATENT DOCUMENTS

| | | |
|---|---|---|
| 2009/0205886 A1 | 8/2009 | Supina et al. |
| 2009/0209146 A1 | 8/2009 | Jegel |
| 2009/0209381 A1 | 8/2009 | Ai et al. |
| 2009/0221390 A1 | 9/2009 | Houle |
| 2009/0223727 A1 | 9/2009 | Tolksdorf |
| 2009/0324453 A1 | 12/2009 | Harinath et al. |
| 2010/0126692 A1 | 5/2010 | Min et al. |
| 2011/0082607 A1* | 4/2011 | Chorian et al. ............ 701/22 |
| 2012/0132394 A1 | 5/2012 | Oberti et al. |

OTHER PUBLICATIONS

International Search Report and Written Opinion, ISA/US, PCT/US2011/066146, Cummins Inc., Mar. 29, 2012.

Ashley, Steven, SMA-based 'energy-scavenging device' could convert exhaust heat into useful power, SAE International, Mar. 2, 2010, http://www.sae.org/mags/aei/7461.

* cited by examiner

US 8,833,496 B2

SYSTEM, METHOD, AND APPARATUS FOR BATTERY PACK THERMAL MANAGEMENT

BACKGROUND

The present application relates to thermal management of battery packs, and more particularly but not exclusively relates to battery packs in hybrid power systems. Battery packs for hybrid powered applications lose efficiency and operating life if the temperature of the battery pack is too high or too low. At early run-times for a system, the battery pack temperature tends to be low. After the application warms up and especially at high power conditions, the battery pack can generate excessive heat. Accordingly, there is a demand for further improvements in this area of technology.

SUMMARY

One embodiment is a unique method for thermal management of a hybrid power system battery pack. A further embodiment captures energy from the battery pack excess heat. Further embodiments, forms, objects, features, advantages, aspects, and benefits shall become apparent from the following description and drawings.

DESCRIPTION OF THE ILLUSTRATIVE EMBODIMENTS

Figure 1:
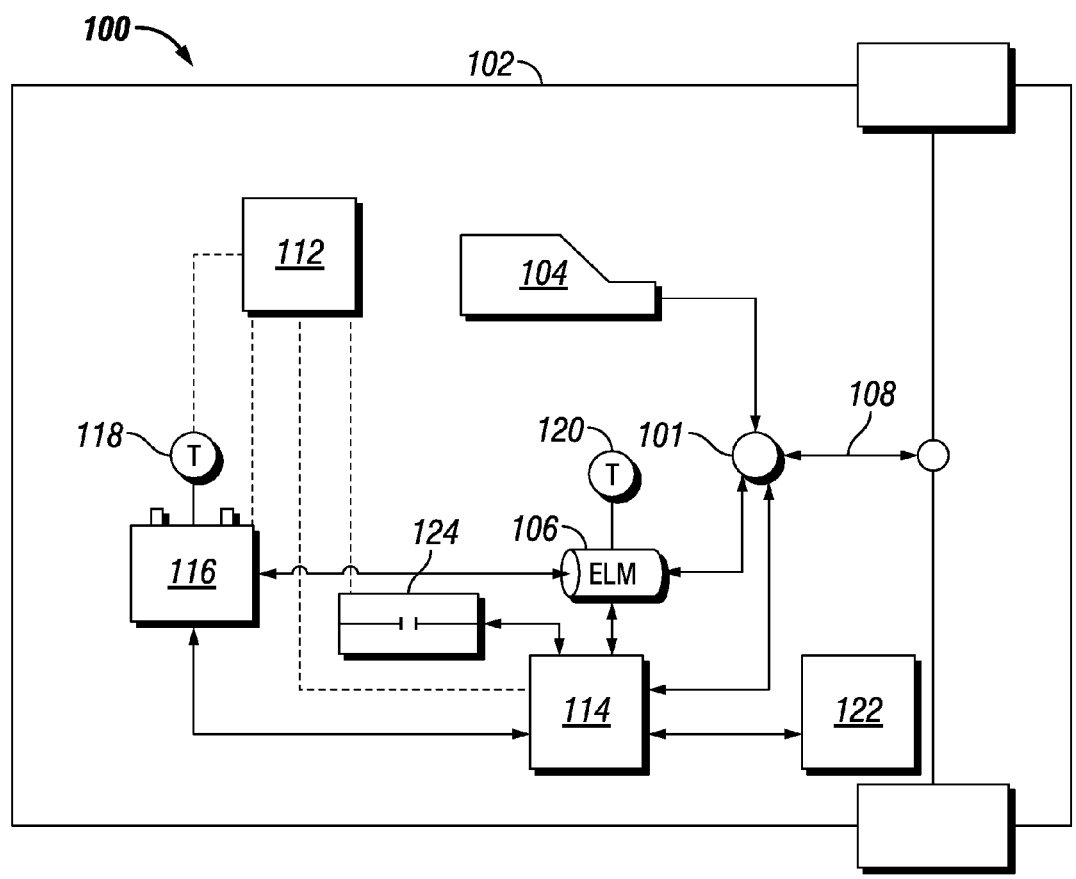
FIG. 1 is a schematic diagram of a system for thermal management of a hybrid power system battery pack.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated and protected.

FIG. 1 is a schematic diagram of a system 100 for thermal management of a hybrid power system battery pack 116 (battery pack). The system includes a vehicle 102 having a driveline 108 operatively coupled to a hybrid power train. The hybrid power train includes an internal combustion engine 104 and an electric motor 106. The system further includes the battery pack 116 electrically coupled to the electric motor 106. The hybrid power train may include the electric motor 106, an electric generator, and/or an electric motor/generator. The hybrid power train is illustrated with the engine 104 and electric motor 106 operatively coupled to the driveline 108 through a power splitter 101 in a parallel arrangement. The arrangement of the hybrid power train may be series, parallel, series-parallel, or any other arrangement understood in the art.

The driveline 108 may be connected to the power sources 104, 106 through other devices than a power splitter 101, and the hybrid power train may further include transmissions, torque converters, or other devices known in the art. The hybrid power train may further include other power sources than the electric motor 106 and the engine 104, although at least one device in the hybrid power train will be an electric motor 106 or electric motor/generator coupled to the battery pack 116. The power sources in the system 100 may all connect to the driveline 108, or a subset of the power sources may connect to the driveline 108 while other power sources support the connected power sources. The system 100 is illustrated in an application including a vehicle 102, but other applications are contemplated herein.

The exemplary system 100 further includes a controller 112 structured to functionally execute certain operations for thermal management of the battery pack 116. In certain embodiments of the system 100, features to provide thermal management of the battery pack 116 are all performed with hardware and may not include a controller 112. The exemplary controller 112, when present, performs certain operations as described in the section referencing FIG. 2.

The exemplary system 100 includes a temperature sensor 118 that provides a temperature measurement or estimate of the battery pack 116. The exemplary system 100 further includes a temperature sensor 120 that provides a temperature measurement or estimate of the electric motor 106. The illustrated temperature sensors 118, 120 are exemplary, and a system 100 may not include temperature sensors and/or may include temperature sensors in other locations. The system further includes a capacitive element that may be an ultracapacitor 124. The ultracapacitor 124, when present, is selectively coupled to power electronics 114 in the system 100, to the battery pack 116, or to other devices in the system 100. The selection of the coupling of the ultracapacitor 124 to other components in the system 100 may be performed by the controller 112, by a shape memory alloy device (not shown) responsive to a temperature of the battery pack 116, and/or by any other device in the system 100 as known in the art.

The power electronics 114 include voltage conversion devices, which may be electrical components or solid state devices. An exemplary power electronics 114 device includes a rectifier converting AC power from an electric generator for use by the battery pack 116. The exemplary power electronics 114 device further includes an inverter converting DC power from the battery pack 116 for use by the electric motor 106. Exemplary power electronics 114 may further convert a voltage and/or a frequency of an electrical energy source to a different value for use in various components of the system 100.

The exemplary system 100 further includes an auxiliary load 122 that is selectively coupled to the power electronics 114, to the battery pack 116, or to other devices in the system 100. The selection of the coupling of the auxiliary load 122 to other components in the system 100 may be performed by the controller 112, by a shape memory alloy device (not shown) responsive to a temperature of the battery pack 116, and/or by any other device in the system 100 as known in the art. Examples of auxiliary loads 122 include a power window, power door, a sound system, vehicle lights, a power steering device, a power-assisted braking device, and/or a climate control device. In certain embodiments, an auxiliary load 122 includes a resistive device or other component structured to dissipate supplied electrical power, which may be utilized to heat a portion of the system 100 (e.g. a passenger compartment of the vehicle) and/or which may be dissipated to the environment.

The system 100 further includes one or more devices for removing thermal energy from the battery pack 116, and securing at least a portion of the removed thermal energy. The devices may be responsive to a temperature of the battery pack 116 exceeding a threshold temperature value, and/or responsive to a command from the controller 112. The command from the controller 112 may be provided in response to a heat transfer value indicating that the temperature of the battery pack 116 is too high, and/or a in response to a temperature of the battery pack 116 compared to a threshold temperature.

An exemplary device for removing thermal energy from the battery pack 116 includes a thermoelectric device (not shown). The thermoelectric device is thermally coupled, or selectively thermally coupled, to the battery pack 116, and operates on a Seebeck effect, Peltier effect, and/or Thomson effect as known in the art. The thermoelectric device provides electrical energy to any device in the system 100, including, without limitation, the battery pack 116, an ultracapacitor 124, the electric motor 106, and/or an auxiliary load 122. The providing of the electrical energy to a device in the system 100 secures the removed thermal energy. The thermoelectric device may provide the electrical energy in a manner according to current conditions, for example providing the electrical energy to an auxiliary load 122 when the load has a present power requirement, and to the battery pack 116 when the load does not have a present power requirement.

Another exemplary device for removing thermal energy from the battery pack 116 includes a shape memory alloy (SMA) that is thermally coupled, or selectively thermally coupled, to the battery pack 116. The SMA changes shape or undergoes mechanical stress in response to receiving thermal energy from the battery pack 116. An exemplary SMA secures the removed thermal energy by providing mechanical energy to a device in the system, including the electric motor 106, the power splitter 101, the driveline 108, a crankshaft of the engine 104, a camshaft of the engine 104, and/or any other device that is structured to receive mechanical energy from the SMA. An exemplary SMA operates a small rotational engine, for example by operating a dual pulley system where the dual pulleys are connected by SMA springs or wires such that when one wire heats and one wire cools the pulleys are driven. The dual pulley rotational engines are known in the art, and any other SMA based device to generate mechanical energy and/or rotational mechanical energy is also contemplated herein. In one example, the mechanical energy is provided to the selected device with a high ratio gear between the rotational engine operated by the SMA and the recipient device of the mechanical energy.

Another exemplary SMA device produces electrical energy from the SMA based rotational engine and provides the electrical energy to a device within the system. Another exemplary SMA device induces stress on a piezoelectric element, and provides the generated electrical energy to a device within the system. Additional or alternative SMA devices secure the removed thermal energy by converting the mechanical energy induced in the SMA to potential energy in a mechanical device (e.g. winding a spring or raising a counterweight), or other methods of capturing mechanical stress for present or later utilization.

In certain embodiments, the system 100 further includes one or more devices for providing heat to the battery pack 116. The devices may be responsive to a temperature of the battery pack 116 being below a threshold temperature value, and/or responsive to a command from the controller 112. The command from the controller 112 may be provided in response to a heat transfer value indicating that the temperature of the battery pack 116 is too low, and/or a in response to a temperature of the battery pack 116 compared to a threshold temperature.

Exemplary devices to provide heat to the battery pack 116 include any of the thermoelectric devices described preceding, wherein electrical energy is supplied to the thermoelectric device, and generated heat is provided to the battery pack 116. Another exemplary device for providing heat to the battery pack includes a device coupling the electric motor 106 and/or one or more auxiliary loads 122 to the battery pack 116 and thereby increase a load on the battery pack 116 generating heat. Another exemplary device for providing heat to the battery pack 116 includes an SMA device that provides a load to the battery pack 116 at low temperatures, for example by drawing current from the battery pack 116 and/or by closing a circuit (not shown) to an electrical device in the system 100 that draws current from the battery pack 116.

Figure 2:
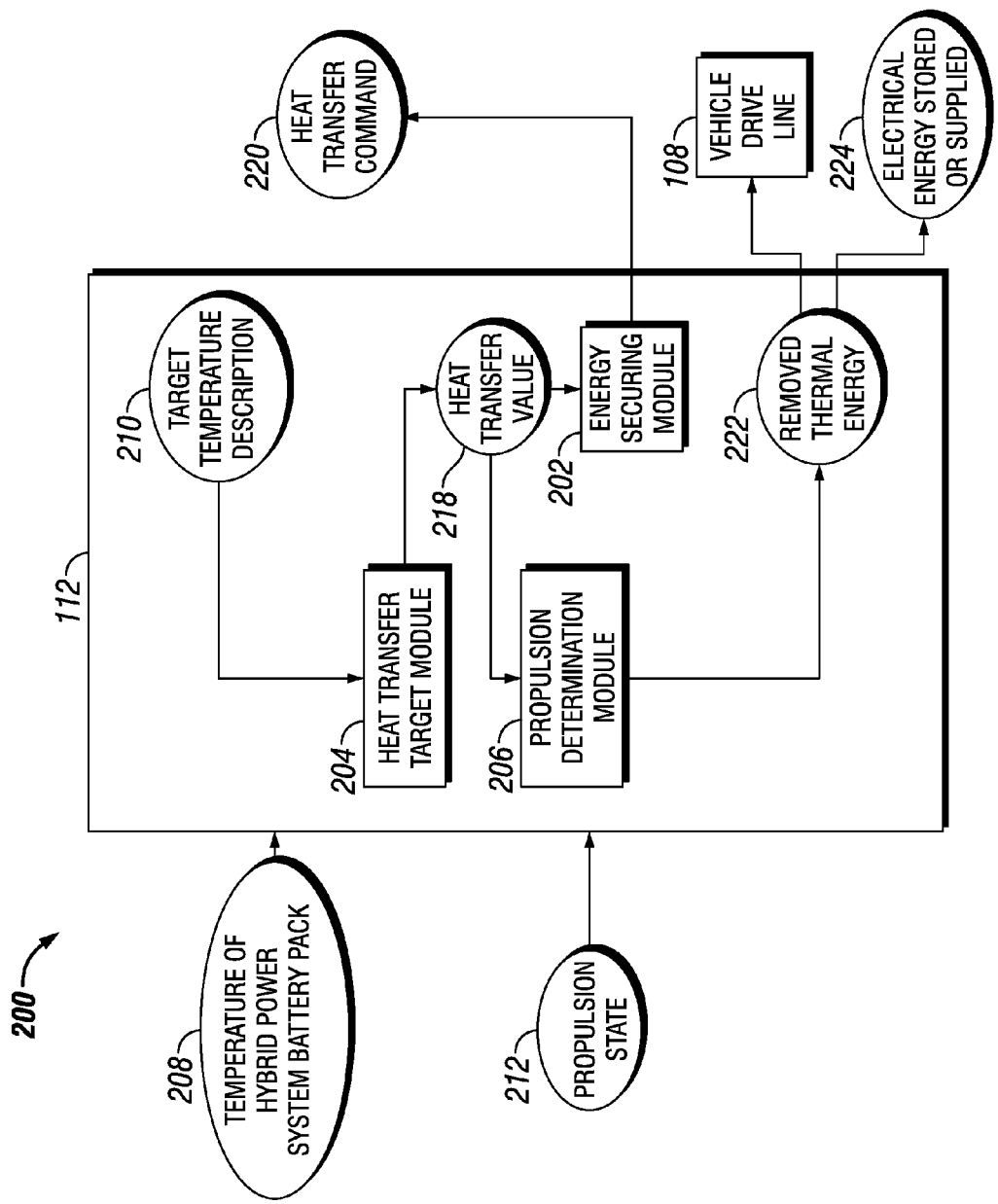
FIG. 2 is a schematic block diagram of a controller that functionally executes operations for thermal management of a hybrid power system battery pack.

Referencing FIG. 2, an apparatus 200 including an exemplary controller 112 to provide battery pack thermal management is shown. In certain embodiments, the controller forms a portion of a processing subsystem including one or more computing devices having memory, processing, and communication hardware. The controller may be a single device or a distributed device, and the functions of the controller may be performed by hardware or software. The controller 112 includes a number of modules structured to functionally execute the operations of the controller 112. The description herein includes the use of modules to highlight the functional independence of the features of the elements described. A module may be implemented as operations by software, hardware, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or part with other modules or devices.

The apparatus 200 may be included in a system having a hybrid power train including an internal combustion engine and an electric motor, a battery pack electrically coupled to the electric motor, and an energy securing device thermally coupled to the battery pack. The energy securing device removes thermal energy from the battery pack, and secures at least a portion of the removed thermal energy. In certain embodiments, the energy securing device is a thermoelectric device that converts thermal energy from the battery pack to electrical energy, and provides the electrical energy to an electronic device. The electronic device may be the battery pack, an ultracapacitor, the electric motor, an electric generator, an electric motor-generator including the electric motor, and an electric device having a present power requirement.

The apparatus 200 includes a controller 112 having a heat transfer target module 204 that determines a heat transfer value 218 in response to the temperature of the battery pack 208 and a target temperature description 210. In one example, the target temperature description 210 includes an operating temperature range and the controller 112 determines the heat transfer value 218 as a value that will drive the temperature of the battery pack 116 toward the operating temperature range. In certain embodiments, the target temperature description 210 is a target temperature value, a target temperature value with hysteresis, an operating temperature range, and/or the operating temperature range with a hysteresis. For example, the operating temperature range may be 15-27° C., with a 2° hysteresis, such that heat transfer value 218 indicates heating at 13° C. and cooling at 29° C., but turns off the heating or cooling within the range 15-27° C.

The provided temperature ranges are exemplary only, and the desirable temperature ranges for a given system 100 depend upon qualities of the specific battery pack 116 known to one of skill in the art or available from a manufacturer of the battery pack 116. Additionally, desirable temperature ranges may be selected to promote battery pack 116 life (generally cooler temperature values) or battery pack 116 efficiency (generally medium to high temperature values). The heat transfer value 218 can be a modeled value, a value determined from a feedback control scheme with gain values using a difference between the current temperature of the battery pack 208 and a value of the target temperature description 210 as an error term, and/or may be a value limited according to a maximum warmup or cooldown rate of the battery pack 116. In certain embodiments, the heat transfer value 218 may be a discrete or descriptive value indicating that heating, cooling, or no temperature adjustment is required.

The controller 112 further includes an energy securing module 202 that provides a heat transfer command 220 in response to the heat transfer value 218 indicating the temperature of the battery pack is too high. The energy securing device removes the thermal energy from the battery pack in response to the heat transfer command 220. An exemplary apparatus 200 further includes a thermal generation device that supplies thermal energy to the battery pack in response to the heat transfer command 220, where the heat transfer value 218 indicates a temperature of the battery pack is too low. Exemplary thermal generation devices and energy securing devices are described in the description referencing FIG. 1. One exemplary thermal generation device includes a shape memory alloy that supplies the thermal energy by electrically loading the battery pack, whereby the battery pack produces the thermal energy in response to the loading. Loading examples of the battery pack include connecting the battery pack to a useful load, and connecting the battery pack to a resistive load.

An exemplary apparatus 200 is included in a system having a hybrid power train that includes a driveline of a vehicle. The exemplary apparatus 200 further includes a propulsion determination module 206 that interprets a propulsion state 212 of the vehicle. The propulsion state 212 indicates whether the vehicle is in motion and being powered by the hybrid power train. The energy securing device further secures the removed thermal energy by providing the removed thermal energy to the driveline of the vehicle in response to the propulsion state 212 indicating the electric motor is providing motive power to the driveline of the vehicle. In a further example, the apparatus 200 includes the energy securing device securing the removed thermal energy by providing the removed thermal energy as electrical energy to the battery pack, to an ultracapacitor, and/or to an auxiliary load in response to the propulsion state 212 indicating the electric motor is not providing motive power to the driveline of the vehicle.

The operational descriptions which follow provide illustrative embodiments of a procedure for thermal management of a battery pack. Operations described are understood to be exemplary only, and operations may be combined or divided, and added or removed, as well as re-ordered in whole or part, unless stated explicitly to the contrary herein.

An exemplary procedure includes operating a hybrid power train having an internal combustion engine, an electric motor, a battery pack electrically coupled to the electric motor, and a driveline that motively couples the engine and the electric motor to a vehicle. The procedure includes an operation to generate thermal energy in the battery pack, an operation to remove an amount of the thermal energy from the battery pack, and an operation to secure at least a portion of the removed thermal energy. Further exemplary operations of the procedure include securing the removed thermal energy by converting the removed thermal energy to electrical energy; converting the removed thermal energy to rotational mechanical energy; converting the removed thermal energy to rotational mechanical energy and generating electrical energy from the rotational mechanical energy; and/or converting the removed thermal energy to rotational mechanical energy and mechanically utilizing the rotational mechanical energy. Exemplary operations to mechanically utilize the rotational mechanical energy include transferring the rotational mechanical energy to a crankshaft of an engine, to a camshaft of an engine, and/or to a vehicle accessory.

An exemplary procedure further includes an operation to remove the amount of the thermal energy in response to determining that a temperature of the battery pack is greater than a temperature target, and/or an operation to add an amount of thermal energy to the battery pack in response to determining that a temperature of the battery pack is lower than a temperature target. Another exemplary procedure includes an operation to load the battery pack, for example with an SMA device or by electrically connecting an auxiliary load to the battery pack. An exemplary procedure further includes an operation to remove thermal energy from the battery pack by removing the thermal energy from the battery pack with a shape memory alloy device.

As is evident from the figures and text presented above, a variety of embodiments according to the present invention are contemplated.

An exemplary set of embodiments includes an apparatus for thermally managing a hybrid power train battery pack, the apparatus including a hybrid power train having an internal combustion engine and an electric motor. The apparatus includes a battery pack electrically coupled to the electric motor, and an energy securing device thermally coupled to the battery pack. The energy securing device removes thermal energy from the battery pack, and secures at least a portion of the removed thermal energy. Exemplary energy securing devices include a thermoelectric device, a shape memory alloy, and/or a piezoelectric device.

In certain embodiments, the energy securing device is a thermoelectric device that converts thermal energy from the battery pack to electrical energy, and provides the electrical energy to an electronic device. The electronic device may be the battery pack, an ultracapacitor, the electric motor, an electric generator, an electric motor-generator including the electric motor, and an electric device having a present power requirement. Exemplary electric devices having a present power requirement include, without limitation, a power window, power door, a sound system, vehicle lights, a power steering device, and/or a climate control device.

A further embodiment includes a heat transfer target module that determines a heat transfer value in response to the temperature of the battery pack and a target temperature description and an energy securing module that provides a heat transfer command in response to the heat transfer value indicating the temperature of the battery pack is too high. The energy securing device removes the thermal energy from the battery pack in response to the heat transfer command. Exemplary target temperature descriptions include a temperature target, a temperature target with hysteresis, a range of temperature values, and a range of temperature values with hysteresis. An exemplary apparatus further includes a thermal generation device that supplies thermal energy to the battery pack in response to the heat transfer command. An exemplary thermal generation device includes a shape memory alloy that supplies the thermal energy by electrically loading the battery pack, whereby the battery pack produces the thermal energy in response to the loading. Loading examples of the battery pack include connecting the battery pack to a useful load, and connecting the battery pack to a resistive load.

An exemplary apparatus further includes the hybrid power train including a driveline of a vehicle, where the apparatus further includes a propulsion determination module that interprets a propulsion state of the vehicle. The energy securing device further secures the removed thermal energy by providing the removed thermal energy to the driveline of the vehicle in response to the propulsion state indicating the electric motor is providing motive power to the driveline of the vehicle. An exemplary apparatus includes the energy securing device securing the removed thermal energy by providing the removed thermal energy as electrical energy to the battery pack, to an auxiliary load, and/or to an ultracapacitor in response to the propulsion state indicating the electric motor is not providing motive power to the driveline of the vehicle.

Another exemplary set of embodiments is a system including a vehicle having a driveline operatively coupled to a hybrid power train, the hybrid power train including an internal combustion engine and an electric motor. The system further includes a battery pack electrically coupled to the electric motor, and a means for removing thermal energy from the battery pack and securing at least a portion of the removed thermal energy. The exemplary system further includes a means for determining whether a temperature of the battery pack is too high, and the means for removing and securing thermal energy from the battery pack further performs the removing and securing in response to the temperature of the battery pack being too high. An exemplary system further includes a means for determining whether a temperature of the battery pack is too low, and a means for heating the battery pack in response to the temperature of the battery pack being too low.

Yet another exemplary embodiment includes a method for thermal management of a battery pack. The method includes operating a hybrid power train having an internal combustion engine, an electric motor, a battery pack electrically coupled to the electric motor, and a driveline that motively couples the engine and the electric motor to a vehicle. The method includes generating thermal energy in the battery pack, removing an amount of the thermal energy from the battery pack, and securing at least a portion of the removed thermal energy.

Exemplary operations to secure the removed thermal energy include converting the removed thermal energy to electrical energy, converting the removed thermal energy to rotational mechanical energy, generating electrical energy from the rotational mechanical energy, and/or mechanically utilizing the rotational mechanical energy. Exemplary operations to mechanically utilize the rotational mechanical energy include transferring the rotational mechanical energy to a crankshaft of an engine, to a camshaft of an engine, and/or to a vehicle accessory.

An exemplary method further includes removing the amount of the thermal energy in response to determining that a temperature of the battery pack is greater than a temperature target, and/or adding an amount of thermal energy to the battery pack in response to determining that a temperature of the battery pack is lower than a temperature target. An exemplary operation to load the battery pack includes loading the battery pack with a shape memory alloy device. An exemplary operation to remove thermal energy from the battery pack includes removing the thermal energy from the battery pack with a shape memory alloy device.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
    a hybrid power train comprising an internal combustion engine and an electric motor, wherein the hybrid power train further comprises a driveline of a vehicle;
    a hybrid power system battery pack electrically coupled to the electric motor;
    an energy securing device thermally coupled to the hybrid power system battery pack, the energy securing device structured to remove thermal energy from the hybrid power system battery pack, and to secure at least a portion of the removed thermal energy;
    a heat transfer target module structured to determine a heat transfer value in response to the temperature of the hybrid power system battery pack and a target temperature description;
    an energy securing module structured to provide a heat transfer command in response to the heat transfer value indicating the temperature of the hybrid power system battery pack is too high;
    a propulsion determination module structured to interpret a propulsion state of the vehicle; and
    wherein the energy securing device is further structured to remove the thermal energy from the hybrid power system battery pack in response to the heat transfer command and to secure the at least a portion of the removed thermal energy by providing the removed thermal energy to the driveline of the vehicle in response to the propulsion state indicating the electric motor is providing motive power to the driveline of the vehicle.

2. The apparatus of claim 1, wherein the energy securing device comprises at least one device selected from the devices consisting of a thermoelectric device, a shape memory alloy, and a piezoelectric device.

3. The apparatus of claim 1, wherein the energy securing device comprises a thermoelectric device structured to convert thermal energy from the hybrid power system battery pack to electrical energy, and to provide the electrical energy to at least one electronic device selected from the devices consisting of the hybrid power system battery pack, an ultracapacitor, the electric motor, an electric generator, an electric motor-generator including the electric motor, and an electric device having a present power requirement.

4. The apparatus of claim 1, wherein the target temperature description comprises a temperature description selected from the descriptions consisting of a temperature target, a temperature target with hysteresis, a range of temperature values, and a range of temperature values with hysteresis.

5. The apparatus of claim 1, further comprising a thermal generation device structured to supply thermal energy to the hybrid power system battery pack in response to the heat transfer command.

6. The apparatus of claim 5, wherein the thermal generation device comprises a shape memory alloy structured to supply the thermal energy by electrically loading the hybrid power system battery pack.

7. An apparatus, comprising:
    a hybrid power train comprising an internal combustion engine and an electric motor, wherein the hybrid power train further comprises a driveline of a vehicle;

a hybrid power system battery pack electrically coupled to the electric motor;

an energy securing device thermally coupled to the hybrid power system battery pack, the energy securing device structured to remove thermal energy from the hybrid power system battery pack, and to secure at least a portion of the removed thermal energy;

a heat transfer target module structured to determine a heat transfer value in response to the temperature of the hybrid power system battery pack and a target temperature description;

an energy securing module structured to provide a heat transfer command in response to the heat transfer value indicating the temperature of the hybrid power system battery pack is too high;

a propulsion determination module structured to interpret a propulsion state of the vehicle, and wherein the energy securing device is further structured to remove the thermal energy from the hybrid power system battery pack in response to the heat transfer command and to secure the at least a portion of the removed thermal energy by providing the removed thermal energy as electrical energy to one of the hybrid power system battery pack, an ultracapacitor, and an auxiliary load in response to the propulsion state indicating the electric motor is not providing motive power to the driveline of the vehicle.

8. A system, comprising:

a vehicle having a driveline operatively coupled to a hybrid power train, the hybrid power train comprising an internal combustion engine and an electric motor;

a hybrid power system battery pack electrically coupled to the electric motor;

means for determining whether a temperature of the hybrid power system battery pack is too high, wherein the means for determining further comprises a heat transfer target module structured to determine a heat transfer value in response to the temperature of the hybrid power system battery pack and a target temperature description, an energy securing module structured to provide a heat transfer command in response to the heat transfer value indicating the temperature of the hybrid power system battery pack is too high, and a propulsion determination module structured to interpret a propulsion state of the vehicle; and means for removing thermal energy from the hybrid power system battery pack and securing at least a portion of the removed thermal energy in response to the temperature of the hybrid power system battery pack being too high, wherein the means for removing is structured to remove the thermal energy from the hybrid power system battery pack in response to the heat transfer command and to secure the at least a portion of the removed thermal energy by providing the removed thermal energy to the driveline of the vehicle in response to the propulsion state indicating the electric motor is providing motive power to the driveline of the vehicle.

9. The system of claim 8, further comprising:

means for determining whether a temperature of the hybrid power system battery pack is too low; and means for heating the hybrid power system battery pack in response to the temperature of the hybrid power system battery pack being too low.

10. The system of claim 8, wherein the means for removing thermal energy from the hybrid power system battery pack and securing at least a portion of the removed thermal energy further comprises at least one device selected from devices consisting of: a thermoelectric device, a shape memory alloy, and a piezoelectric device.

11. The system of claim 8, wherein the means for removing thermal energy from the hybrid power system battery pack and securing at least a portion of the removed thermal energy further comprises a thermoelectric device structured to convert thermal energy from the hybrid power system battery pack to electrical energy, and to provide the electrical energy to at least one electronic device selected from the devices consisting of the hybrid power system battery pack, an ultracapacitor, the electric motor, an electric generator, an electric motor-generator including the electric motor, and an electric device having a present power requirement.

12. A system, comprising:

a vehicle having a driveline operatively coupled to a hybrid power train, the hybrid power train comprising an internal combustion engine and an electric motor;

a hybrid power system battery pack electrically coupled to the electric motor;

means for removing thermal energy from the hybrid power system battery pack and securing at least a portion of the removed thermal energy;

means for determining whether a temperature of the hybrid power system battery pack is too high, wherein the means for removing thermal energy from the hybrid power system battery pack and securing at least a portion of the removed thermal energy performs the removing and securing in response to the temperature of the hybrid power system battery pack being too high;

wherein the means for determining whether a temperature of the hybrid power system battery pack is too high further comprises a heat transfer target module structured to determine a heat transfer value in response to the temperature of the hybrid power system battery pack and a target temperature description, an energy securing module structured to provide a heat transfer command in response to the heat transfer value indicating the temperature of the hybrid power system battery pack is too high, and a propulsion determination module structured to interpret a propulsion state of the vehicle, and wherein the means for removing thermal energy from the hybrid power system battery pack and securing at least a portion of the removed thermal energy is further structured to remove the thermal energy from the hybrid power system battery pack in response to the heat transfer command and to secure the at least a portion of the removed thermal energy by providing the removed thermal energy as electrical energy to one of the hybrid power system battery pack, an ultracapacitor, and an auxiliary load in response to the propulsion state indicating the electric motor is not providing motive power to the driveline of the vehicle.

* * * * *